UNITED STATES PATENT OFFICE.

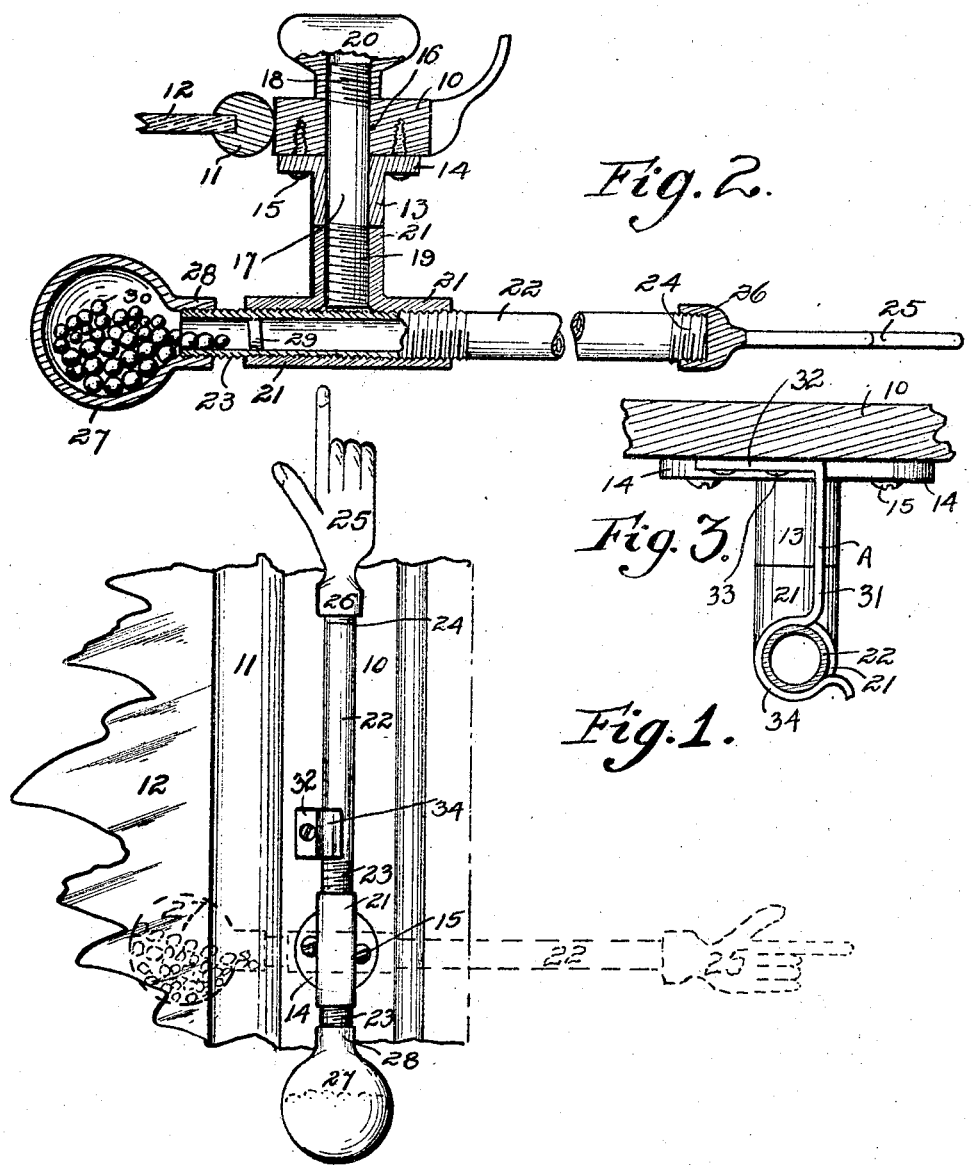

NELSON M. DYER, OF WATERLOO, IOWA, ASSIGNOR OF ONE-FOURTH TO WILLIAM H. PYNE, OF DES MOINES, IOWA, AND ONE-FOURTH TO LYCURGUS V. DARNALL, OF BURLINGTON, IOWA.

AUTOMOBILE-SIGNAL.

1,378,372.

Specification of Letters Patent. Patented May 17, 1921.

Application filed January 31, 1921. Serial No. 441,340.

*To all whom it may concern:*

Be it known that I, NELSON M. DYER, a citizen of the United States, residing at Waterloo, in the county of Blackhawk and State of Iowa, have invented a certain new and useful Automobile-Signal, of which the following is a specification.

The object of my invention is to provide an automobile signal adapted to be fixed to the frame of a wind shield of an automobile, the parts being of simple, durable and inexpensive construction.

More particularly my invention relates to a device for indicating the direction that the operator of an automobile is desirous of going, the parts being so arranged that the operator may engage a knob, or the like, for swinging the indicator member to a certain position which indicates the direction that he is about to take.

Still another object is to provide an arm, capable of swinging movement and having a counterweight on one end for normally tending to hold the device in inoperative position.

Still another object is to provide a resilient clip member for engaging the arm when in inoperative position for positively holding it against any undesired movement.

With these and other objects in view my invention consists in the construction, arrangement and combination of the various parts of my device, whereby the objects contemplated are attained, as hereinafter more fully set forth, pointed out in my claim, and illustrated in the accompanying drawings, in which:

Figure 1 is a front elevation of my device as applied to an automobile.

Fig. 2 is a central, sectional view taken through my device showing how it is applied to a wind shield frame; and Fig. 3 is a sectional view showing the resilient clip for holding the signal device.

In the accompanying drawings I have used the reference numeral 10 to indicate the frame of a wind shield of an automobile. The frame 10 being permanently fixed relative to the automobile.

A movable frame 11 is provided in which is mounted the ordinary glass 12 which completes the wind shield. The device is preferably designed to be used in connection with a closed type of automobile; but it will be understood that it may be used in connection with the ordinary open type automobile.

Fixed to the frame 10 and extending forwardly therefrom is a bearing member 13 which is provided with an annular flange 14 on one end. The flange 14 rests against the outer surface of a portion of the frame 10 and is secured thereto by means of the screws 15.

An opening 16 is provided in the frame 10 which registers with the opening in the bearing member 13. Extended through the opening 16 and the opening in the bearing 13 is a short shaft or tube 17 which is provided with the screw threaded ends 18 and 19.

A knob or hand engaging member 20 is provided with a screw threaded socket which is received on the screw threaded portion 18 of the shaft 17. The knob 20 rests against the frame 10 on the inner side thereof.

A T fitting or joint 21 is fixed to the screw threaded end 19 of the shaft 17. An arm or shaft 22 provided with screw threaded portions 23 and 24 is mounted in the T fitting or joint 21. The screw threaded portion 23 is received in the fitting 21.

An indicator member 25 which is shaped like the human hand is provided with a socket 26. The socket 26 is internally screw threaded and is received on the screw threaded portion or end 24 of the shaft or arm 22.

On the opposite end of the arm 22 is a hollow ball member 27 provided with a neck 28. The neck 28 is internally screw threaded and is received on the screw threaded end 23 of the arm 22.

A plug 29 is mounted in the arm 22, the purpose of which will be hereafter more fully set forth.

It will be understood that if the arm 22 were a solid shaft the plug 29 would not be necessary.

Placed within the hollow ball member 27 is a plurality of shot 30 which are capable of free movement within the ball member 27. The shot 30 in the ball member 27 serves as a counter-weight for the indicator member 25. The plug 29 prevents any of the shot from going into the arm 22 to any great extent.

From the construction of the parts just described it will be seen that I have provided a signal device which is capable of swinging movement on the shaft 17.

The end of the arm 22 which is provided with the indicator member 25 is a great deal longer than the end of the arm provided with the ball member 27. In order to more equally balance the device, the shot 30 is used.

The shot 30 tends to normally hold the signal device in the position shown in solid lines in Fig. 1 of the drawings. When it is desired to move the signal to operative position, then the knob 20 is engaged and rotated slightly which causes the indicator member 25 to be swung to the position shown in dotted lines in Fig. 1, which is the operative position.

As soon as the knob 20 is disengaged, or let go of, the weight caused by the shot 30 will immediately cause the arm and indicator member to be swung back to normal position.

In order to prevent any undesired swinging movement of the arm I have provided a resilient clip device A which consists of an arm 31 having an extension 32 thereon. The extension 32 is screwed to the frame 10 by means of screws 33. The extreme forward end of the arm 31 is bent as at 34 so as to provide a receiving portion for receiving the arm 22.

It will be seen that when the device is moved to operative position and suddenly released, the weight within the ball 27 will cause the arm 22 to be swung to substantially vertical position.

The swinging movement will be limited by the clip A and at the same time the arm 22 will be engaged by the curved portion 34. When once engaged the arm 22 will not be released until some effort is applied to the knob 20 as will be the case when it is desired to use the device.

The curved portion 34 may be enlarged or changed as desired so that the amount of effort required to cause the clip to disengage the arm 22 may be varied as is desired.

In my device I have not shown any means for lighting the indicator member, however, it will be understood that it would be an easy matter to place a light bulb in the member 25.

It will be seen that I have provided a signal device of simple construction, and one which can readily and easily be placed upon an automobile preferably of the closed in type.

If my device were to be used with an open type automobile, then in place of the bearing 13 a suitable bracket would be fixed to the wind shield.

It will be understood that the length of the arm 22 may be varied as is desired for use upon various kinds of automobiles, and whenever the arm 22 is lengthened the amount of shot within the ball member may be varied to take care of any additional weight on the end of the arm which is provided with the indicator member 25.

Some changes may be made in the construction and arrangement of the parts of my machine without departing from the real spirit and purpose of my invention, and it is my intention to cover by my claim, any modified forms of structure or use of mechanical equivalents, which may be reasonably included within their scope.

I claim as my invention:

An automobile signal adapted to be secured to the windshield frame of an automobile or the like including an arm having its ends screw threaded, an indicator secured to one of the screw threaded ends of said arm, a weight secured to the opposite screw threaded end of said arm, a bearing member fixed to the windshield frame, a control shaft extended through the windshield frame and through said bearing member, the outer end of said control shaft being operatively connected with said arm near said weight, a hand engaging member mounted on the inner end of said control shaft whereby it may be engaged for swinging said arm in a vertical plane from inoperative to operative position, the parts being so arranged that the weight normally holds the arm in vertical position.

Des Moines, Iowa, January 17, 1921.

NELSON M. DYER.